United States Patent
Nishimura et al.

(10) Patent No.: US 10,422,685 B2
(45) Date of Patent: Sep. 24, 2019

(54) LOAD MEASURING DEVICE FOR RAILCAR BOGIE

(71) Applicants: KAWASAKI JUKOGYO KABUSHIKI KAISHA, Kobe-shi, Hyogo (JP); SUMITOMO RIKO COMPANY LIMITED, Komaki-shi, Aichi (JP)

(72) Inventors: Takehiro Nishimura, Kobe (JP); Shunichi Nakao, Kobe (JP); Yasufumi Okumura, Kobe (JP); Shigehiro Otsubo, Komaki (JP); Kei Kitagaki, Komaki (JP)

(73) Assignees: KAWASAKI JUKOGYO KABUSHIKI KAISHA, Kobe (JP); SUMITOMO RIKO COMPANY LIMITED, Komaki-shi (JP)

( * ) Notice: Subject to any disclaimer, the term of this patent is extended or adjusted under 35 U.S.C. 154(b) by 289 days.

(21) Appl. No.: 15/108,426

(22) PCT Filed: Dec. 22, 2014

(86) PCT No.: PCT/JP2014/006393
§ 371 (c)(1),
(2) Date: Jun. 27, 2016

(87) PCT Pub. No.: WO2015/098091
PCT Pub. Date: Jul. 2, 2015

(65) Prior Publication Data
US 2016/0320229 A1    Nov. 3, 2016

(30) Foreign Application Priority Data
Dec. 25, 2013 (JP) .................. 2013-267597

(51) Int. Cl.
*G01G 19/04* (2006.01)
*B61K 9/02* (2006.01)
(Continued)

(52) U.S. Cl.
CPC .......... *G01G 19/042* (2013.01); *B61F 5/301* (2013.01); *B61F 5/302* (2013.01); *B61F 5/305* (2013.01);
(Continued)

(58) Field of Classification Search
CPC ...... G01G 19/04; G01G 19/042; B61F 5/301; B61F 5/302; B61F 5/308; B61K 9/00; B61K 9/02
See application file for complete search history.

(56) References Cited

U.S. PATENT DOCUMENTS 3,743,041 A * 7/1973 Videon ................. G01G 19/12
                                                             177/136
3,934,663 A * 1/1976 Johansson ............. G01G 19/12
                                                             177/137
(Continued)

FOREIGN PATENT DOCUMENTS

| JP | 2002-079941 A | 3/2002 |
|---|---|---|
| JP | 4151482 B2 | 9/2008 |
| JP | 2008201389 A | 9/2008 |

OTHER PUBLICATIONS

Jan. 27, 2015 International Search Report issued in Application No. PCT/JP2014/006393.
(Continued)

*Primary Examiner* — Natalie Huls
(74) *Attorney, Agent, or Firm* — Oliff PLC (57) ABSTRACT

A load measuring device for a railcar bogie in which a vibrationproof rubber between an axle box and a bogie frame includes a vertical load fluctuation sensor in parallel
(Continued)

with the vibrationproof rubber and configured to deform in conjunction with elastic deformation of the vibrationproof rubber in a vertical direction, the vibrationproof rubber supporting a downward load from the bogie frame. The vertical load fluctuation sensor changes an electric output by the deformation of the vertical load fluctuation sensor in conjunction with the elastic deformation of the vibrationproof rubber in the vertical direction.

9 Claims, 7 Drawing Sheets

(51) Int. Cl.
  *B61F 5/30* (2006.01)
  *B61K 9/00* (2006.01)
(52) U.S. Cl.
  CPC ............... *B61F 5/308* (2013.01); *B61K 9/00* (2013.01); *B61K 9/02* (2013.01)

(56) References Cited

U.S. PATENT DOCUMENTS

| | | | | |
|---|---|---|---|---|
| 3,935,915 A * | 2/1976 | Seilly | ................... | B60G 9/003 177/136 |
| 4,095,659 A * | 6/1978 | Blench | ................... | G01G 19/12 177/136 |
| 4,215,754 A * | 8/1980 | Hagedorn | ............ | G01G 3/1404 177/137 |
| 4,969,529 A * | 11/1990 | Reichow | ................ | G01G 19/12 177/137 |
| 5,410,109 A * | 4/1995 | Tarter | ..................... | G01G 19/12 177/136 |
| 5,861,581 A * | 1/1999 | Evans | ..................... | G01G 19/08 177/136 |
| 6,441,324 B1 * | 8/2002 | Stimpson | ............. | G01G 19/042 177/137 |
| 7,241,956 B1 * | 7/2007 | Stimpson | ............... | G01G 19/08 177/136 |
| 2001/0013432 A1 * | 8/2001 | Kawaguchi | ............ | G01G 19/08 177/136 |
| 2004/0251058 A1 * | 12/2004 | Carr | ......................... | B61F 5/26 177/136 |
| 2015/0000553 A1 * | 1/2015 | Kimura | ..................... | B61F 5/30 105/197.05 |
| 2015/0219487 A1 * | 8/2015 | Maraini | ................ | G01G 19/042 177/136 |
| 2017/0349189 A1 * | 12/2017 | Nakao | ........................ | B61F 5/52 |
| 2018/0003546 A1 * | 1/2018 | Mignon | ..................... | G01G 23/01 |
| 2018/0029617 A1 * | 2/2018 | Okumura | .................. | B61F 5/52 |
| 2018/0141573 A1 * | 5/2018 | Tsumura | .................... | B61F 5/30 |

OTHER PUBLICATIONS

Jun. 28, 2016 International Preliminary Report on Patentability issued in PCT/JP2014/006393.

* cited by examiner

CAR LONGITUDINAL DIRECTION

Fig. 6

LATERAL DIRECTION

LOAD MEASURING DEVICE FOR RAILCAR BOGIE

TECHNICAL FIELD

The present invention relates to a load measuring device for use in a railcar bogie in which an elastic body constituted by vibrationproof rubber or a suspension spring is interposed between an axle box and a bogie frame.

BACKGROUND ART

Regarding railcar bogies, to deal with wear and the like of wheels, a downward load (wheel load) applied to each wheel is adjusted in some cases in such a manner that a thin liner (spacer) is sandwiched between an axle receiver and a spring receiving seat located at an upper side of the axle receiver and supporting an axle spring. PTL 1 proposes a wheel load measuring device that measures the wheel load by utilizing the liner. The liner of the wheel load measuring device is configured by sandwiching a pressure sensor between two thin adjustment plates and calculates the wheel load based on an output from the pressure sensor. PTL 1 describes that a thickness of the pressure sensor is several tens to a hundred and several tens of micrometers, and a thickness of the entire liner is about 1 to 3 mm.

Citation List

Patent Literature

PTL 1: Japanese Patent No. 4151482

SUMMARY OF INVENTION

Technical Problem

The entire load transferred from a carbody to each wheel passes through the liner. Therefore, even when the bogie is stationary, the pressure sensor is strongly compressed. In addition, the pressure sensor is an extremely thin sheet incorporated in the liner. Therefore, even when the wheel load fluctuates while a railcar is traveling, a further compression allowance of the pressure sensor is little. On this account, a sensitivity of the pressure sensor is low, and it is difficult to measure the wheel load with a high degree of accuracy while the railcar is traveling. In addition, the liner is selectively provided for adjusting the wheel load, and the liner may not be provided depending on the type of the bogie. Therefore, the wheel load measuring device using the liner is not applicable to all the bogies.

An object of the present invention is to provide a load measuring device for a railcar bogie, the load measuring device being easily applicable to various bogies and capable of improving measurement accuracy.

Solution to Problem

A load measuring device for a railcar bogie according to the present invention is a load measuring device for use in a railcar bogie in which a first elastic body constituted by a vibrationproof rubber or a suspension spring is interposed between an axle box and a bogie frame, the load measuring device including a first load fluctuation sensor provided in parallel with the first elastic body and configured to deform in conjunction with elastic deformation of the first elastic body in a first direction that is one of a vertical direction and a lateral direction, the first elastic body supporting a downward load from the bogie frame, the first load fluctuation sensor changing an electric output by the deformation of the first load fluctuation sensor in conjunction with the elastic deformation of the first elastic body in the first direction.

According to the above configuration, the first load fluctuation sensor is provided in parallel with the first elastic body interposed between the axle box and the bogie frame and constituted by the vibrationproof rubber or the suspension spring. Therefore, the first load fluctuation sensor deforms in accordance with the load fluctuation of the first elastic body in the vertical direction or the lateral direction (car width direction) in a state where the first elastic body supports the downward load from the bogie frame. On this account, the first load fluctuation sensor can adequately secure a further deformation allowance in a state where the bogie is stationary. With this, the sensitivity of the first load fluctuation sensor can be increased, and the measurement accuracy can be improved. In addition, since the first load fluctuation sensor is provided in parallel with the first elastic body constituted by the vibrationproof rubber or the suspension spring, the load measuring device is easily applicable to all the bogies including the vibrationproof rubber or the suspension spring.

Advantageous Effects of Invention

As is clear from the above explanation, the present invention is easily applicable to various bogies and capable of improving the measurement accuracy.

DESCRIPTION OF EMBODIMENTS

Hereinafter, embodiments will be explained in reference to the drawings.

Embodiment 1

Figure 1:
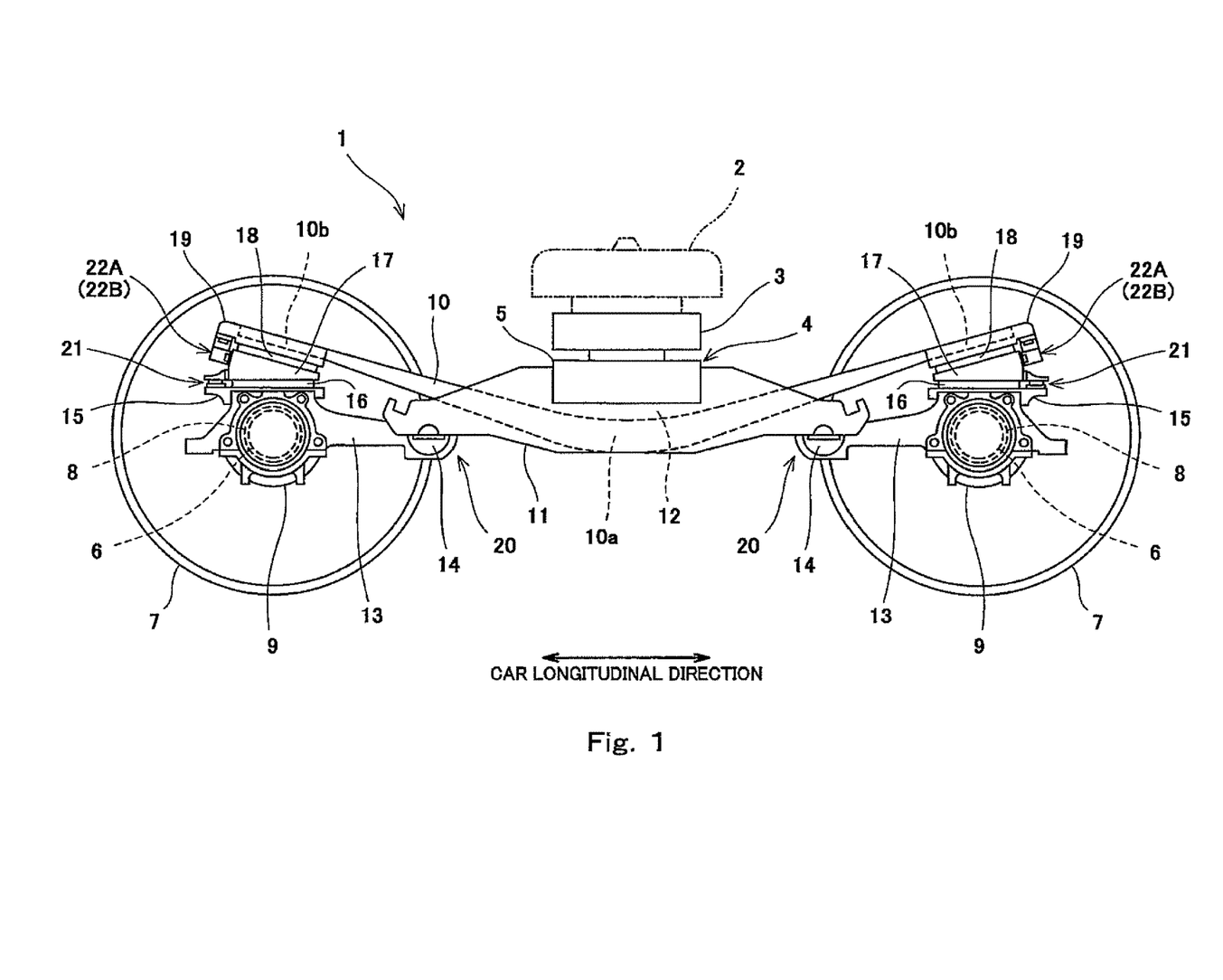
FIG. 1 is a side view of a railcar bogie according to Embodiment 1.

FIG. 1 is a side view of a railcar bogie 1 according to Embodiment 1. As shown in FIG. 1, the bogie 1 includes a bolster 3 and a bogie frame 4. The bolster 3 supports a carbody (not shown) through an air spring 2 that serves as a secondary suspension spring. The bogie frame 4 supports the bolster 3 such that the bolster 3 is rotatable relative to the bogie frame 4 in a yawing direction. The bogie frame 4 includes a cross beam 5 but does not include a so-called side sill. The cross beam 5 is located at a middle of the bogie 1 in a car longitudinal direction (forward/rearward direction) and extends in a lateral direction (car width direction). Axles 6 each extending in the lateral direction are provided in front of and behind the cross beam 5. Wheels 7 are fixed to both lateral direction ends of each axle 6. Bearings 8 rotatably supporting the axle 6 are provided at both lateral direction end portions of the axle 6 so as to be located outside the wheels 7 in the lateral direction. Bearings 8 are accommodated in respective axle boxes 9.

The axle boxes 9 are elastically coupled to both car width direction end portions of the cross beam 5 by coupling devices 20. The coupling device 20 includes an axle beam 13, a pair of receiving seats 11, and a coupling portion 14. The axle beam 13 projects integrally from the axle box 9 toward the cross beam 5. The pair of receiving seats 11 project from the cross beam 5 toward the axle beam 13 and are lined up with an interval in the lateral direction. The coupling portion 14 includes, for example, a rubber bushing (not shown) that elastically couples a tip end portion of the axle beam 13 to the receiving seats 11. To be specific, the bogie 1 of the present embodiment is an axle beam type bogie.

Each of plate springs 10 extending in the car longitudinal direction is provided between the cross beam 5 and the axle box 9. Longitudinal direction middle portions 10a of the plate springs 10 support both respective lateral direction end portions of the cross beam 5 from below. Both longitudinal direction end portions 10b of each of the plate springs 10 are supported by the respective axle boxes 9 from below. To be specific, each of the plate springs 10 serves as both a primary suspension spring and a conventional side sill. The plate springs 10 are made of, for example, fiber-reinforced resin. Each of the middle portions 10a of the plate springs 10 is provided between the pair of receiving seats 11 so as to extend under the cross beam 5. Pressing members 12 are provided under both lateral direction end portions of the cross beam 5, and each of the pressing members 12 includes a lower surface having a circular-arc shape in a side view. The lower surface of the pressing member 12 is placed on the middle portion 10a of the plate spring 10 from above. To be specific, the pressing members 12 press the respective middle portions 10a of the plate springs 10 downward by a downward load (such as a carbody load), transmitted from the cross beam 5, so as not to fix the plate spring 10 in an upward/downward direction.

As described below, an axle box cover 15, a first vibrationproof rubber unit 16, a wedge-shaped member 17, a second vibrationproof rubber unit 18, a spring seat 19, and the like are stacked at an upper portion of the axle box 9 in this order from a lower side. The end portion 10b of the plate spring 10 is placed on the spring seat 19 from above through an elastic sheet 34 (rubber sheet). The end portion 10b of the plate spring 10 is supported in such a posture that an upper surface of the end portion 10b is inclined in a direction to face the middle portion 10a. The middle portion 10a of the plate spring 10 is pressed downward by the pressing member 12. In a side view, the plate spring 10 is formed in a bow shape that is convex downward.

The bogie 1 is provided with a vertical load fluctuation sensor 21 that follows elastic deformation of the first vibrationproof rubber unit 16 in a vertical direction while the railcar is traveling. The vertical load fluctuation sensor 21 is provided in parallel with the first vibrationproof rubber unit 16 on a load transfer route from the bogie frame 4 toward the wheel 7. In a plan view, the vertical load fluctuation sensor 21 is provided outside the first vibrationproof rubber unit 16. The bogie 1 is also provided with first and second lateral load fluctuation sensors 22A and 22B that follow elastic deformation of the second vibrationproof rubber unit 18 in the lateral direction while the railcar is traveling. The first and second lateral load fluctuation sensors 22A and 22B are provided in parallel with the second vibrationproof rubber unit 18 on the load transfer route from the bogie frame 4 toward the wheel 7. In a plan view, the first and second lateral load fluctuation sensors 22A and 22B are provided outside the second vibrationproof rubber unit 18.

Figure 2:
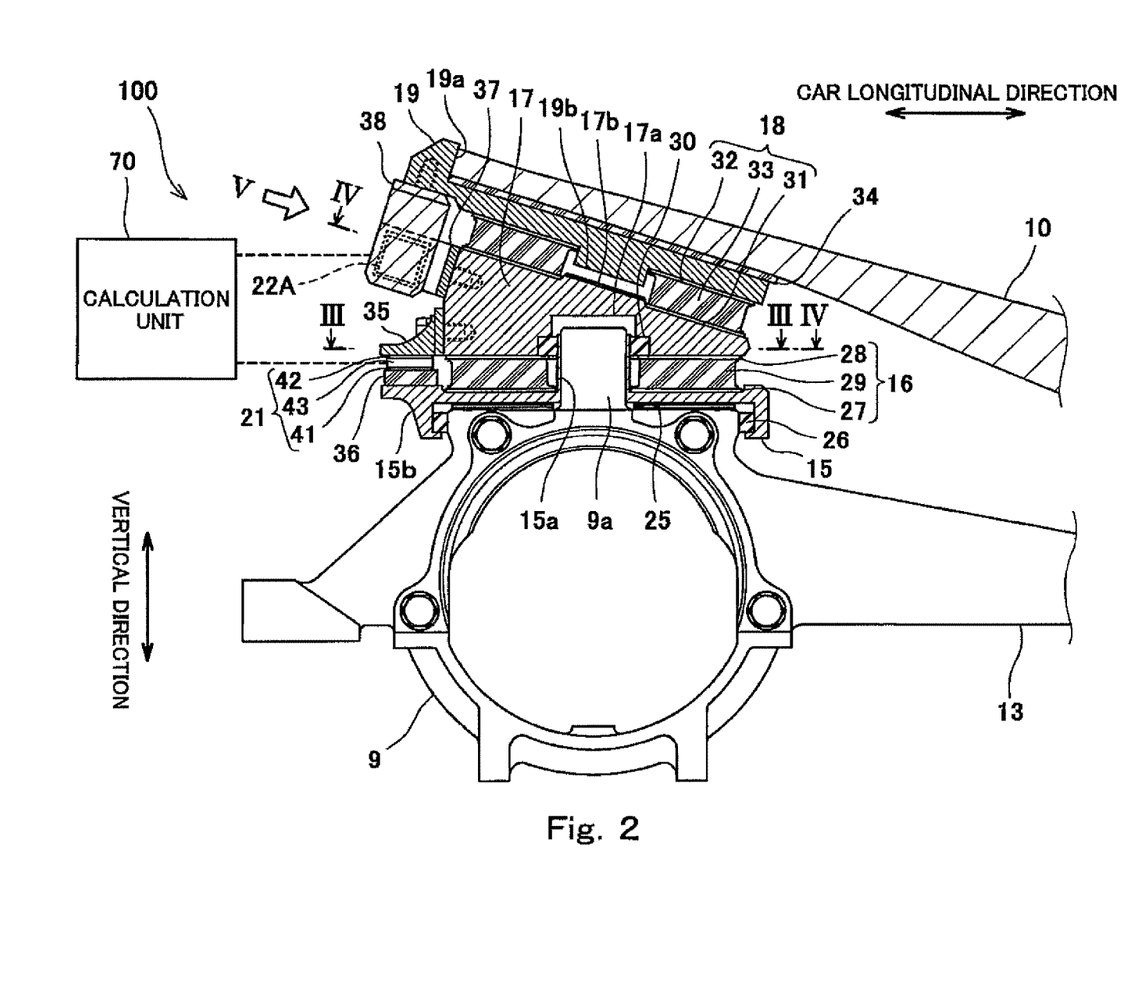
FIG. 2 is a major component side view showing a cross section of a part of the bogie shown in FIG. 1.
Figure 3:
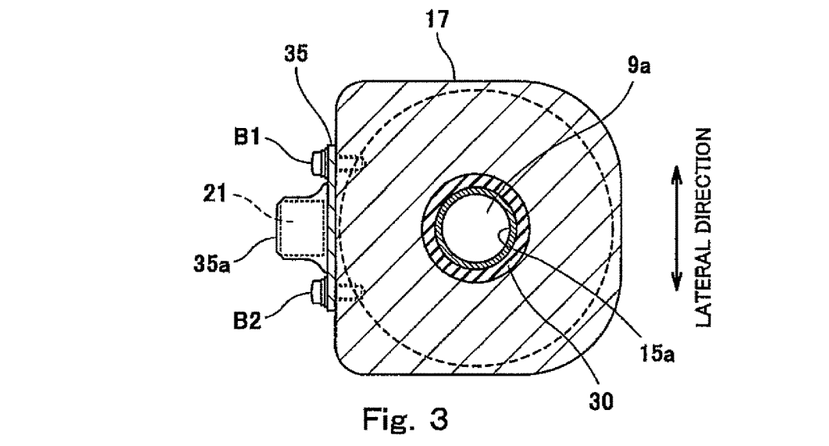
FIG. 3 is a cross-sectional view taken along line III-III of FIG. 2.
Figure 4:
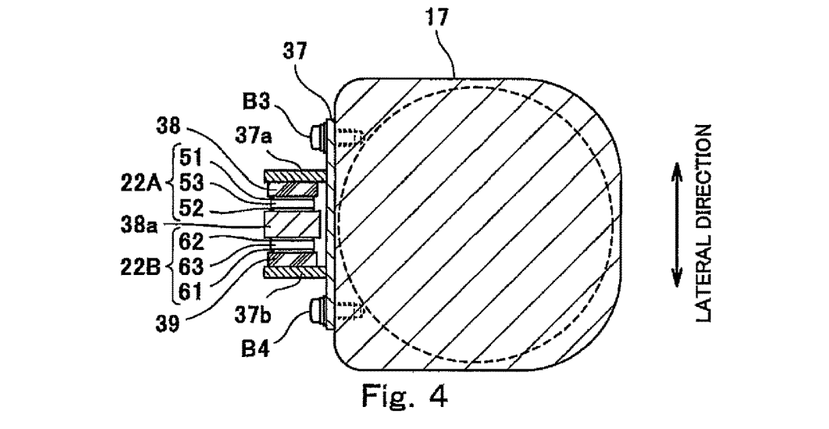
FIG. 4 is a cross-sectional view taken along line IV-IV of FIG. 2.
Figure 5:
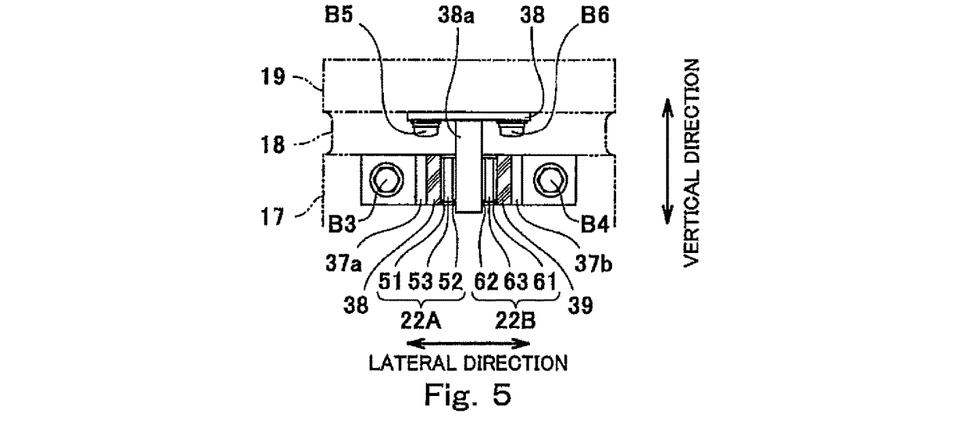
FIG. 5 is a front view of major components when viewed from a direction V of FIG. 2.

FIG. 2 is a major component side view showing a cross section of a part of the bogie 1 shown in FIG. 1. FIG. 3 is a cross-sectional view taken along line of FIG. 2. FIG. 4 is a cross-sectional view taken along line IV-IV of FIG. 2. FIG. 5 is a front view of major components when viewed from a direction V of FIG. 2. As shown in FIG. 2, the axle box 9 includes a protruding portion 9a projecting upward from an upper surface of the axle box 9. The axle box cover 15 covers the axle box 9 from above. The axle box cover 15 includes a tubular portion 15a projecting upward from a middle portion of the axle box cover 15. The axle box cover 15 is positioned relative to the axle box 9 in a horizontal direction in such a manner that the tubular portion 15a fits the protruding portion 9a. The axle box cover 15 has an inverted concave cross section. A sealing member 26 is interposed between an inner side surface of the axle box cover 15 and an outer side surface of the axle box 9. One or more thin (for example, 1 to 3 mm) liners 25 are inserted between a lower surface of the axle box cover 15 and the upper surface of the axle box 9. Further, the axle box cover 15 includes a lower bracket portion 15b that projects outward beyond the first vibrationproof rubber unit 16 in the horizontal direction (for example, outward in the car longitudinal direction) and has a horizontal upper surface.

The first vibrationproof rubber unit 16 is placed on the axle box cover 15 from above. The first vibrationproof rubber unit 16 includes a lower plate 27 having an annular shape, an upper plate 28 having an annular shape, and a vibrationproof rubber 29 sandwiched between the lower plate 27 and the upper plate 28. Lower and upper end surfaces of the vibrationproof rubber 29 are adhered to the lower plate 27 and the upper plate 28, respectively. The lower plate 27 of the first vibrationproof rubber unit 16 is positioned relative to the axle box cover 15 in the horizontal direction in such a manner as to fit the tubular portion 15a.

The wedge-shaped member 17 is placed on the first vibrationproof rubber unit 16 from above. The wedge-shaped member 17 is made of, for example, metal and has stiffness. A lower surface of the wedge-shaped member 17 is a horizontal surface. An upper surface of the wedge-shaped member 17 is an inclined surface that is inclined so as to face a car longitudinal direction middle side of the bogie 1. To be specific, the upper surface of the wedge-shaped member 17 is an inclined surface that becomes high toward an outside in the car longitudinal direction. A concave portion 17a is formed at a middle portion of the lower surface of the wedge-shaped member 17. The wedge-shaped member 17 is positioned relative to the axle box cover 15 in the horizontal direction in such a manner that the concave portion 17a fits the tubular portion 15a through a ring spacer 30. With this, the upper plate 28 of the first vibrationproof rubber unit 16 is also positioned indirectly relative to the axle box cover 15 in the horizontal direction. To be specific, the first vibrationproof rubber unit 16 is positioned such that the upper plate 28 is not displaced relative to the lower plate 27 in the horizontal direction.

The second vibrationproof rubber unit 18 is placed on the upper surface of the wedge-shaped member 17 from above. The second vibrationproof rubber unit 18 includes a lower plate 31 having an annular shape, an upper plate 32 having an annular shape, and a vibrationproof rubber 33 sandwiched between the lower plate 31 and the upper plate 32 and having an annular shape. The vibrationproof rubber 33 is made of the same material as the vibrationproof rubber 29. Lower and upper end surfaces of the vibrationproof rubber 33 are adhered to the lower plate 31 and the upper plate 32, respectively. A protruding portion 17b projecting upward is formed at a middle portion of the upper surface of the wedge-shaped member 17. The lower plate 31 of the second vibrationproof rubber unit 18 is positioned relative to the wedge-shaped member 17 in the horizontal direction in such a manner as to fit the protruding portion 17b.

The spring seat 19 is placed on an upper surface of the second vibrationproof rubber unit 18 from above. The spring seat 19 includes a concave portion 19a that is open upward and also open toward the car longitudinal direction middle side of the bogie 1. The end portion 10b of the plate spring 10 is placed on the concave portion 19a of the spring seat 19 from above through the elastic sheet 34 (rubber sheet). The protruding portion 17b projecting downward is formed on a lower surface of the spring seat 19. The upper plate 32 of the second vibrationproof rubber unit 18 is positioned relative to the spring seat 19 in the horizontal direction in such a manner as to fit a protruding portion 19b. To be specific, according to the second vibrationproof rubber unit 18, the lower plate 31 moves together with the wedge-shaped member 17 in the horizontal direction, and the upper plate 32 moves together with the spring seat 19 in the horizontal direction. Therefore, the upper plate 32 can be displaced relative to the lower plate 31 in the horizontal direction.

The bogie 1 is equipped with a load measuring device 100 including the vertical load fluctuation sensor 21, the first lateral load fluctuation sensor 22A, the second lateral load fluctuation sensor 22B, and a calculation unit 70. Based on a static wheel load input from outside and an output regarding a vertical-direction load fluctuation from the vertical load fluctuation sensor 21 while the railcar is traveling, the calculation unit 70 calculates a wheel load P generated while the railcar is traveling. In addition, based on outputs regarding a lateral-direction load fluctuation from the first and second load fluctuation sensors 22A and 22B while the railcar is traveling, the calculation unit 70 calculates lateral pressure Q of the wheel 7, the lateral pressure Q being generated while the railcar is traveling.

As shown in FIGS. 2 and 3, an upper bracket 35 is fixed to the wedge-shaped member 17 by fixing members B1 and B2 (such as bolts). The upper bracket 35 projects outward in the horizontal direction (for example, outward in the car longitudinal direction) beyond the first vibrationproof rubber unit 16 and includes a horizontal lower surface. It should be noted that the upper bracket 35 may be fixed to the wedge-shaped member 17 by welding or adhesion instead of the fixing members or may be formed as a part of the wedge-shaped member 17. The lower surface of the upper bracket 35 faces an upper surface of the lower bracket portion 15b in the vertical direction. The vertical load fluctuation sensor 21 is adhered to the lower surface of the upper bracket 35. A press-contact member 36 made of an insulating material (for example, an elastic member made of rubber or the like) is adhered to the upper surface of the lower bracket portion 15b. The press-contact member 36 press-contacts a lower surface of the vertical load fluctuation sensor 21.

The vertical load fluctuation sensor 21 includes: a lower surface electrode 41 that press-contacts an upper surface of the press-contact member 36; an upper surface electrode 42 adhered to the lower surface of the upper bracket 35; and an intermediate member 43 sandwiched between the lower surface electrode 41 and the upper surface electrode 42 in the vertical direction. Since the press-contact member 36 is made of an insulating material, the lower surface electrode 41 and the press-contact member 36 are electrically insulated from each other. Since an adhesive interposed between the upper surface electrode 42 and the upper bracket 35 is made of an insulating material, the upper surface electrode 42 and the upper bracket 35 are also electrically insulated from each other.

The vertical load fluctuation sensor 21 is provided in parallel with the vibrationproof rubber 29 on the load transfer route from the bogie frame 4 toward the wheel 7 and follows the elastic deformation of the vibrationproof rubber 29 in the vertical direction, the vibrationproof rubber 29 supporting the downward load from the bogie frame 4. Specifically, the lower surface electrode 41 moves in the vertical direction in conjunction with the movement of the lower end surface of the vibrationproof rubber 29 in the vertical direction through the lower plate 27, the axle box cover 15, and the press-contact member 36. In other words, the lower surface electrode 41 is displaced in the vertical direction integrally with the lower plate 27 of the vibrationproof rubber unit 16. Similarly, the upper surface electrode 42 moves in the vertical direction in conjunction with the movement of the upper end surface of the vibrationproof rubber 29 in the vertical direction through the upper plate 28, the wedge-shaped member 17, and the upper bracket 35. In other words, the upper surface electrode 42 is displaced in the vertical direction integrally with the upper plate 28 of the vibrationproof rubber unit 16.

The intermediate member 43 is made of a different material from the vibrationproof rubber 29. The intermediate member 43 is deformed by relative movements of the lower surface electrode 41 and the upper surface electrode 42 in the vertical direction to change electrical outputs (for example, voltages) from the lower surface electrode 41 and the upper surface electrode 42. As one example, when the intermediate member 43 is an elastic member made of resin or elastomer having a dielectric property, an electrostatic capacitance between the electrodes 41 and 42 changes by a change in a distance between the lower surface electrode 41 and the upper surface electrode 42 in the vertical direction, and as a result, a voltage between the lower surface electrode 41 and the upper surface electrode 42 can be changed. As another example, when the intermediate member 43 is a piezoelectric substance, the voltage between the electrodes 41 and 42 can be changed by a change in a load applied to the intermediate member 43 in the vertical direction. As yet another example, when the load fluctuation sensor itself is pressure-sensitive conductive rubber whose electrical resistance changes by pressure change, a voltage between opposing ends of the pressure-sensitive conductive rubber can be changed by a change in a load applied to the pressure-sensitive conductive rubber.

The intermediate member 43 is lower in deformation resistance than the vibrationproof rubber 29. For example, the deformation resistance of the intermediate member 43 is less than 50% of the deformation resistance of the vibrationproof rubber 29 and is preferably less than 10% of the deformation resistance of the vibrationproof rubber 29. When the intermediate member 43 is an elastic member, the intermediate member 43 is lower in spring constant than the vibrationproof rubber 29. For example, the spring constant of the intermediate member 43 is less than 50% of the spring constant of the vibrationproof rubber 29 and is preferably less than 10% of the spring constant of the vibrationproof rubber 29. An area of the intermediate member 43 when viewed from the vertical direction is smaller than an area of the vibrationproof rubber 29 when viewed from the vertical direction. For example, the area of the intermediate member 43 is less than 50% of the area of the vibrationproof rubber 29 and is preferably less than 10% of the area of the vibrationproof rubber 29. A thickness of the intermediate member 43 in the vertical direction is not less than five times a thickness of the upper surface electrode 42 or the lower surface electrode 41 in the vertical direction and is preferably not less than ten times the thickness of the upper surface electrode 42 or the lower surface electrode 41 in the vertical direction.

As shown in FIGS. 2, 4, and 5, a bracket 37 is fixed to the wedge-shaped member 17 by fixing members B3 and B4 (for example, bolts). The bracket 37 includes a right bracket portion 37a having a vertical left side surface and a left bracket portion 37b having a vertical right side surface. The right bracket portion 37a and the left bracket portion 37b project outward in the horizontal direction (for example, outward in the car longitudinal direction) beyond the second vibrationproof rubber unit 18. The left side surface of the right bracket portion 37a and the right side surface of the left bracket portion 37b face each other with an interval in the lateral direction. It should be noted that the bracket 37 may be fixed to the wedge-shaped member 17 by welding or adhesion instead of the fixing members or may be formed as a part of the wedge-shaped member 17.

A bracket 38 is fixed to the spring seat 19 by fixing members B5 and B6 (for example, bolts). The bracket 38 includes a middle bracket portion 38a inserted between the right bracket portion 37a and the left bracket portion 37b. A right side surface of the middle bracket portion 38a is a vertical surface and faces the left side surface of the right bracket portion 37a with an interval. A left side surface of the middle bracket portion 38a is a vertical surface and faces the right side surface of the left bracket portion 37b with an interval.

The first lateral load fluctuation sensor 22A and the second lateral load fluctuation sensor 22B are adhered to the right and left side surfaces of the middle bracket portion 38a, respectively. Press-contact members 39 and 40 (for example, elastic members made of rubber or the like) made of an insulating material are adhered to the left side surface of the right bracket portion 37a and the right side surface of the left bracket portion 37b, respectively. The left side surface of the press-contact member 39 located at a right side press-contacts an outer side surface (right side surface) of the lateral load fluctuation sensor 22A, and an outer side surface (right side surface) of the press-contact member 40 located at a left side press-contacts the left side surface of the lateral load fluctuation sensor 22B.

Each of the first and second lateral load fluctuation sensors 22A and 22B is the same in structure as the vertical load fluctuation sensor 21 and is provided in such a posture as to be rotated around the car longitudinal direction by 90° relative to the vertical load fluctuation sensor 21. Specifically, the first lateral load fluctuation sensor 22A includes: an outer side surface electrode 51 (right side surface electrode) that press-contacts the press-contact member 39; an inner side surface electrode 52 (left side surface electrode) adhered to the right side surface of the middle bracket portion 38a; and an intermediate member 53 sandwiched between the outer side surface electrode 51 and the inner side surface electrode 52 in the lateral direction. The second lateral load fluctuation sensor 22B includes: an outer side surface electrode 61 (left side surface electrode) that press-contacts the press-contact member 40; an inner side surface electrode 62 (right side surface electrode) adhered to the left side surface of the middle bracket portion 38a; and an intermediate member 63 sandwiched between the outer side surface electrode 61 and the inner side surface electrode 62 in the lateral direction. Since the press-contact members 39 and 40 are made of an insulating material, the outer side surface electrode 51 and the press-contact member 39 are electrically insulated from each other, and the outer side surface electrode 61 and the press-contact members 40 are electrically insulated from each other. Since an adhesive between the inner side surface electrode 52 and the middle bracket portion 38a and an adhesive between the inner side surface electrode 62 and the middle bracket portion 38a are made of an insulating material, the inner side surface electrode 52 and the middle bracket portion 38a are electrically insulated from each other, and the inner side surface electrode 62 and the middle bracket portion 38a are electrically insulated from each other.

The first and second lateral load fluctuation sensors 22A and 22B are provided in parallel with the vibrationproof rubber 33 on the load transfer route from the bogie frame 4 toward the wheel 7 and follow the elastic deformation of the vibrationproof rubber 33 in the lateral direction, the vibrationproof rubber 33 supporting the downward load from the bogie frame 4. Specifically, the inner side surface electrodes 51 and 61 move in the lateral direction in conjunction with the movement of the lower end surface of the vibrationproof rubber 33 in the lateral direction through the lower plate 31, the wedge-shaped member 17, and the bracket 37. In other words, the inner side surface electrodes 51 and 61 are displaced in the lateral direction integrally with the lower plate 31 of the vibrationproof rubber unit 18. Similarly, the outer side surface electrodes 52 and 62 move in the lateral direction in conjunction with the movement of the upper end surface of the vibrationproof rubber 33 in the lateral direction through the upper plate 32, the spring seat 19, and the bracket 38. In other words, the outer side surface electrodes 52 and 62 are displaced in the lateral direction integrally with the upper plate 32 of the vibrationproof rubber unit 18.

The intermediate members 53 and 63 of the first and second lateral load fluctuation sensors 22A and 22B are made of a different material from the vibrationproof rubber 33. In the present embodiment, the intermediate members 53 and 63 are made of the same material as the intermediate member 43 of the vertical load fluctuation sensor 21. To be specific, the intermediate member 53 is deformed by relative movements of the outer side surface electrode 51 and the inner side surface electrode 52 in the lateral direction to change electric outputs (for example, voltages) from the outer side surface electrode 51 and the inner side surface electrode 52, and the intermediate member 63 is deformed by relative movements of the outer side surface electrode 61 and the inner side surface electrode 62 in the lateral direction to change electric outputs (for example, voltages) from the outer side surface electrode 61 and the inner side surface electrode 62.

Each of the intermediate members 53 and 63 is lower in deformation resistance than the vibrationproof rubber 33. For example, the deformation resistance of each of the intermediate members 53 and 63 is less than 50% of the deformation resistance of the vibrationproof rubber 33 and is preferably less than 10% of the deformation resistance of the vibrationproof rubber 33. When the intermediate members 53 and 63 are elastic members, each of the intermediate members 53 and 63 is lower in spring constant than the vibrationproof rubber 33. For example, the spring constant of each of the intermediate members 53 and 63 is less than 50% of the spring constant of the vibrationproof rubber 33 and is preferably less than 10% of the spring constant of the vibrationproof rubber 33. An area of each of the intermediate members 53 and 63 when viewed from the lateral direction is smaller than an area of the vibrationproof rubber 33 when viewed from the lateral direction. For example, the area of each of the intermediate members 53 and 63 is less than 50% of the area of the vibrationproof rubber 33 and is preferably less than 10% of the area of the vibrationproof rubber 33. A thickness of each of the intermediate members 53 and 63 in the lateral direction is not less than five times a thickness of each of the electrodes 51, 52, 61, and 62 in the lateral direction and is preferably less than ten times the thickness of each of the electrodes 51, 52, 61, and 62 in the lateral direction.

The calculation unit 70 is communicably connected to the vertical load fluctuation sensor 21, the first lateral load fluctuation sensor 22A, and the second lateral load fluctuation sensor 22B by wires or radio. The calculation unit 70 receives the electric output from the vertical load fluctuation sensor 21 and the electric outputs from the first and second lateral load fluctuation sensors 22A and 22B and calculates the wheel load P and the lateral pressure Q. The wheel load P is a load applied from the wheel 7 to a rail downward in the vertical direction, and the lateral pressure Q is a load applied from the wheel 7 to a side surface of the rail in the lateral direction.

The calculation unit 70 calculates the wheel load P by Formula 1 below.

$$P = P0 + \Delta P \quad \text{Formula 1}$$

In this formula, P0 denotes a static wheel load that is a wheel load when the bogie 1 is stationary, and $\Delta P$ denotes a wheel load fluctuation amount while the railcar is traveling. The static the wheel load P0 is measured by an external static wheel load measuring device (not shown) before or after the railcar travels. Then, the static the wheel load P0 is input to the calculation unit 70. The wheel load fluctuation amount $\Delta P$ is calculated by Formula 2 below.

$$\Delta P = f(V) \quad \text{Formula 2}$$

In this formula, V denotes an electric output (for example, a voltage) from the vertical load fluctuation sensor 21, and f denotes a function set by calculating in advance a correspondence relation between the output from the vertical load fluctuation sensor 21 and the wheel load fluctuation amount $\Delta P$. Further, the calculation unit 70 calculates the lateral pressure Q by Formula 3 below.

$$Q = Q0 + \Delta Q = \Delta Q \quad \text{Formula 3}$$

In this formula, Q0 denotes lateral pressure when the bogie 1 is stationary. Specifically, zero is input as Q0. Further, $\Delta Q$ is a lateral pressure fluctuation amount while the railcar is traveling. The lateral pressure fluctuation amount $\Delta Q$ is calculated by at least one of Formulas 4 and 5 below.

$$\Delta Q = f1(V1) \quad \text{Formula 4}$$

$$\Delta Q = f2(V2) \quad \text{Formula 5}$$

In these formulas, V1 denotes an electric output (for example, a voltage) from the first lateral load fluctuation sensor 22A, and V2 denotes an electric output (for example, a voltage) from the second lateral load fluctuation sensor 22B. Further, f1 denotes a function set by calculating in advance a correspondence relation between the output from the first lateral load fluctuation sensor 22A and the lateral pressure fluctuation amount $\Delta Q$, and f2 denotes a function set by calculating in advance a correspondence relation between the output from the second lateral load fluctuation sensor 22B and the lateral pressure fluctuation amount $\Delta Q$.

The calculation unit 70 inputs sensor values of the vertical load fluctuation sensor 21 and the first and second lateral load fluctuation sensors 22A and 22B to Formulas 1 to 5, the sensor values being detected on the same time axis while the railcar is traveling. Then, the calculation unit 70 calculates the wheel load P and the lateral pressure Q and outputs a Q/P value (value obtained by dividing the lateral pressure by the wheel load) while the railcar is traveling. The Q/P value is used as a derailment coefficient. The possibility of the derailment can be easily determined by determining whether or not the Q/P value while the railcar is traveling falls within a predetermined allowable range.

According to the above-explained configuration, the vertical load fluctuation sensor 21 is provided in parallel with the vibrationproof rubber 29 interposed between the axle box 9 and the bogie frame 4, and the lateral load fluctuation sensors 22A and 22B are provided in parallel with the vibrationproof rubber 33 interposed between the axle box 9 and the bogie frame 4. Therefore, the intermediate member 43 of the vertical load fluctuation sensor 21 and the intermediate members 53 and 63 of the lateral load fluctuation sensors 22A and 22B deform in accordance with the load fluctuation of the vibrationproof rubber 29 in the vertical direction and the load fluctuation of the vibrationproof rubber 33 in the lateral direction in a state where the vibrationproof rubbers 29 and 33 support the downward load from the bogie frame 4. On this account, each of the intermediate members 43, 53, and 63 of the vertical load fluctuation sensor 21 and the lateral load fluctuation sensors 22A and 22B can adequately secure a further deformation allowance in a state where the bogie 1 is stationary. With this, the sensitivity of each of the vertical load fluctuation sensor 21 and the lateral load fluctuation sensors 22A and 22B can be increased, and the measurement accuracy can be improved.

Further, since the vertical load fluctuation sensor 21 is provided in parallel with the vibrationproof rubber 29, and the lateral load fluctuation sensors 22A and 22B are provided in parallel with the vibrationproof rubber 33, the vertical load fluctuation sensor 21 and the lateral load fluctuation sensors 22A and 22B are easily applicable to all the bogies including the vibrationproof rubbers 29 and 33. Further, since each of the intermediate members 43, 53, and 63 is lower in deformation resistance than each of the vibrationproof rubbers 29 and 33, behaviors of the elastic deformation of the vibrationproof rubbers 29 and 33 can be prevented from being inhibited. Furthermore, since the vertical load fluctuation sensor 21 is provided outside the vibrationproof rubber 29, and the lateral load fluctuation sensors 22A and 22B are provided outside the vibrationproof rubber 33, the vertical load fluctuation sensor 21 and the lateral load fluctuation sensors 22A and 22B can be attached to existing bogies easily and additionally.

Embodiment 2

Figure 6:
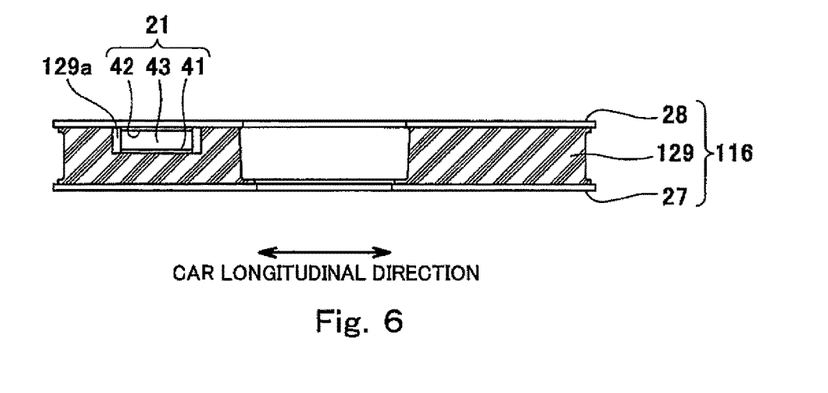
FIG. 6 is a cross-sectional view for explaining the position of a vertical load fluctuation sensor according to Embodiment 2.
Figure 7:
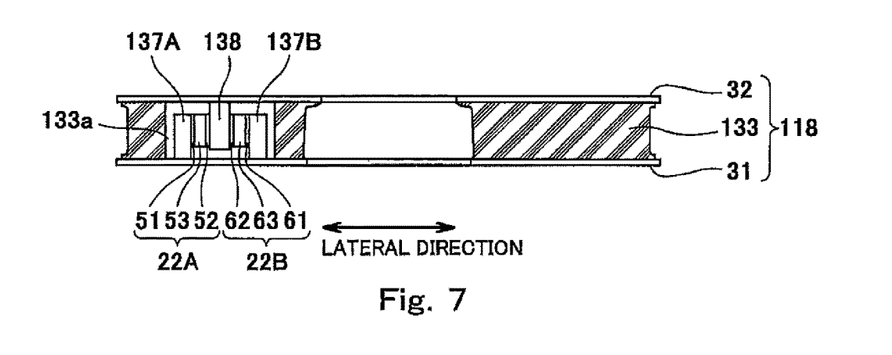
FIG. 7 is a cross-sectional view for explaining the positions of lateral load fluctuation sensors according to Embodiment 2.

FIG. 6 is a cross-sectional view for explaining the position of the vertical load fluctuation sensor 21 according to Embodiment 2. FIG. 7 is a cross-sectional view for explaining the positions of the lateral load fluctuation sensors 22A and 22B according to Embodiment 2. The same reference signs are used for the same components as in Embodiment 1, and explanations thereof are omitted. As shown in FIGS. 6 and 7, the vertical load fluctuation sensor 21 is provided in a space 129a surrounded by a vibrationproof rubber 129, and the lateral load fluctuation sensors 22A and 22B are provided in a space 133a surrounded by a vibrationproof rubber 133. A first vibrationproof rubber unit 116 of Embodiment 2 is provided at the same position as the first vibrationproof rubber unit 16 of Embodiment 1, and a second vibrationproof rubber unit 118 of Embodiment 2 is provided at the same position as the second vibrationproof rubber unit 18 of Embodiment 1. It should be noted that in the bogie of Embodiment 2, the vertical load fluctuation sensor 21 is not provided outside the first vibrationproof rubber unit 116, and the lateral load fluctuation sensors 22A and 22B are not provided outside the second vibrationproof rubber unit 118.

The first vibrationproof rubber unit 116 includes: the lower plate 27 having an annular shape; the upper plate 28 having an annular shape; and the vibrationproof rubber 129 sandwiched between the lower plate 27 and the upper plate 28. Lower and upper end surfaces of the vibrationproof rubber 129 are adhered to the lower plate 27 and the upper plate 28, respectively. The vibrationproof rubber 129 includes a concave space 129a that is open on an upper or lower surface of the vibrationproof rubber 129. The vertical load fluctuation sensor 21 is accommodated in the concave space 129a. The lower surface electrode 41 of the vertical load fluctuation sensor 21 press-contacts a portion of the vibrationproof rubber 129, the portion being a lower surface of the concave space 129a. The upper surface electrode 42 of the vertical load fluctuation sensor 21 is fixed to the upper plate 28 through an insulating material (for example, an insulating adhesive). The vertical load fluctuation sensor 21 is spaced apart from the vibrationproof rubber 129 in the horizontal direction. Electric wires (not shown) connected to the lower surface electrode 41 and the upper surface electrode 42 are led to an outside from the first vibrationproof rubber unit 116 to be connected to the calculation unit 70 (see FIG. 2).

The second vibrationproof rubber unit 118 includes: the lower plate 31 having an annular shape; the upper plate 32 having an annular shape; and the vibrationproof rubber 133 sandwiched between the lower plate 31 and the upper plate 32. Lower and upper end surfaces of the vibrationproof rubber 133 are adhered to the lower plate 31 and the upper plate 32, respectively. The vibrationproof rubber 133 includes a hole space 133a that is open on upper and lower surfaces of the vibrationproof rubber 133. The first lateral load fluctuation sensor 22A and the second lateral load fluctuation sensor 22B are accommodated in the hole space 133a. The outer side surface electrodes 51 and 61 of the lateral load fluctuation sensors 22A and 22B are fixed to side bracket portions 137A and 137B through insulating materials (for example, insulating adhesives), respectively, the side bracket portions 137A and 137B projecting upward from the lower plate 31 in the hole space 133a. The side bracket portions 137A and 137B are spaced apart from the upper plate 32 in the vertical direction.

The inner side surface electrodes 52 and 62 of the lateral load fluctuation sensors 22A and 22B are fixed to a middle bracket portion 138 through insulating materials (for example, insulating adhesives), the middle bracket portion 138 projecting downward from the upper plate 32 in the hole space 133a. The middle bracket portion 138 is spaced apart from the lower plate 31 in the vertical direction and is also spaced apart from a portion of the vibrationproof rubber 133, the portion being a side surface of the hole space 133a. Electric wires (not shown) connected to the outer side surface electrodes 51 and 61 and the inner side surface electrodes 52 and 62 are led to an outside from the second vibrationproof rubber unit 118 to be connected to the calculation unit 70 (see FIG. 2).

According to the above-explained configuration, the vertical load fluctuation sensor 21 is provided in parallel with the vibrationproof rubber 129 interposed between the axle box 9 and the bogie frame 4, and the lateral load fluctuation sensors 22A and 22B are provided in parallel with the vibrationproof rubber 133 interposed between the axle box 9 and the bogie frame 4. Therefore, the intermediate member 43 of the vertical load fluctuation sensor 21 deforms in accordance with the load fluctuation of the vibrationproof rubber 129 in the vertical direction in a state where the vibrationproof rubber 129 supports the downward load from the bogie frame 4, and the intermediate members 53 and 63 of the lateral load fluctuation sensors 22A and 22B deform in accordance with the load fluctuation of the vibrationproof rubber 133 in the lateral direction in a state where the vibrationproof rubber 133 supports the downward load from the bogie frame 4. On this account, each of the intermediate members 43, 53, and 63 of the vertical load fluctuation sensor 21 and the lateral load fluctuation sensors 22A and 22B can adequately secure a further deformation allowance in a state where the bogie is stationary. With this, the sensitivity of each of the vertical load fluctuation sensor 21 and the lateral load fluctuation sensors 22A and 22B can be increased, and the measurement accuracy can be improved.

Further, since the vertical load fluctuation sensor 21 is provided in parallel with the vibrationproof rubber 129 on the load transfer route from the bogie frame 4 toward the wheel 7 (see FIG. 1), and the lateral load fluctuation sensors 22A and 22B are provided in parallel with the vibrationproof rubber 133 on the load transfer route from the bogie frame 4 toward the wheel 7 (see FIG. 1), the vertical load fluctuation sensor 21 and the lateral load fluctuation sensors 22A and 22B are easily applicable to all the bogies including the vibrationproof rubbers 129 and 131. Further, since the vertical load fluctuation sensor 21 is accommodated in the space 129a surrounded by the vibrationproof rubber 129, and the lateral load fluctuation sensors 22A and 22B are accommodated in the space 133a surrounded by the vibrationproof rubber 133, the sensors 21, 22A, and 22B can be easily protected from foreign matters (for example, dusts). Since other components are the same as those in Embodiment 1, explanations thereof are omitted.

Embodiment 3

Figure 8:
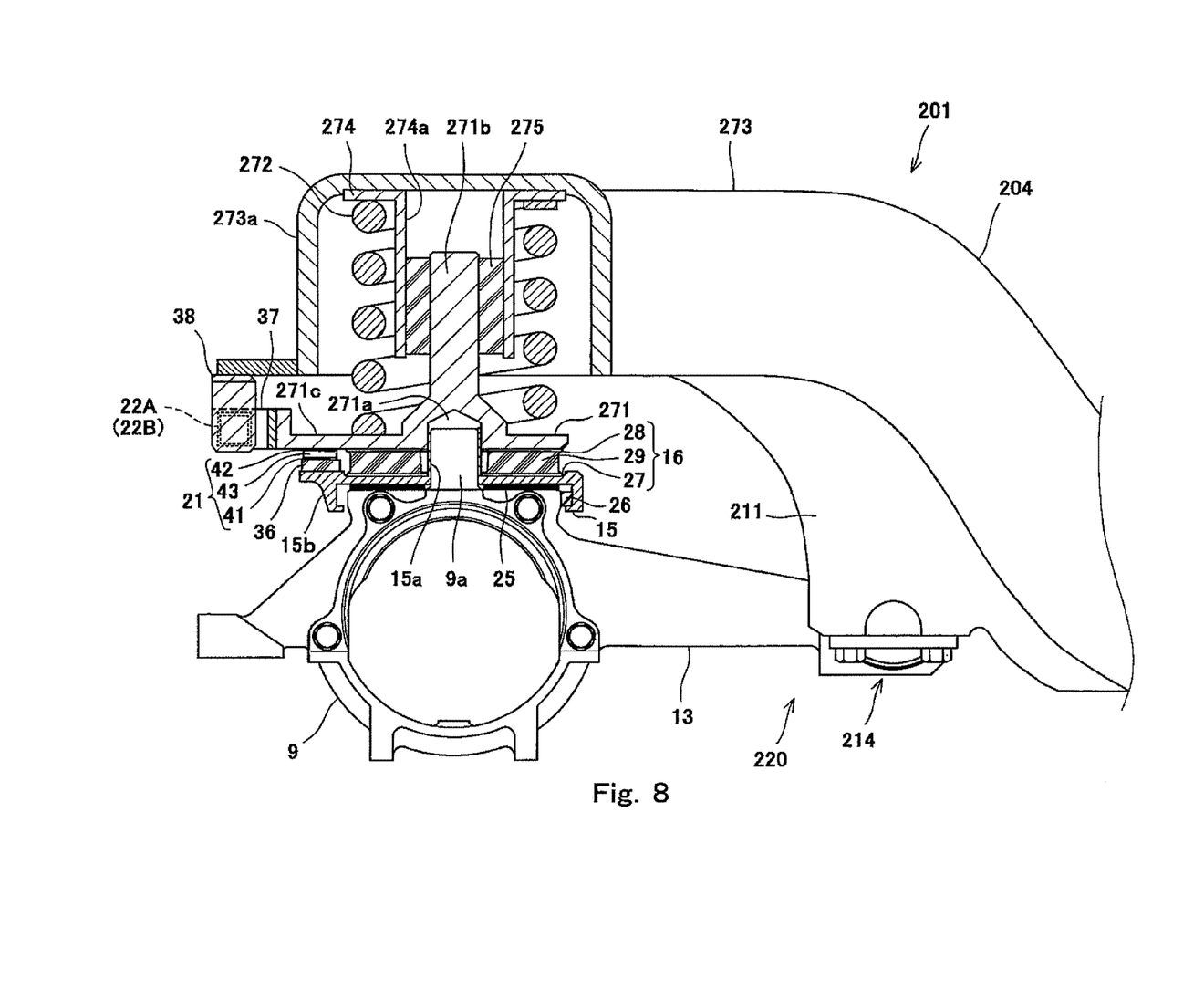
FIG. 8 is a major component side view showing a cross section of a part of the bogie according to Embodiment 3.

FIG. 8 is a major component side view showing a cross section of a part of a bogie 201 according to Embodiment 3. The same reference signs are used for the same components as in Embodiment 1, and explanations thereof are omitted. As shown in FIG. 8, a bogie frame 204 of the bogie 201 of Embodiment 3 includes a side sill 273. The axle box 9 is elastically coupled to the side sill 273 by a coupling device 220. The coupling device 220 includes a pair of receiving seats 211, the axle beam 13, and a coupling portion 214. The pair of receiving seats 211 project from the side sill 273 and are lined up with an interval in the lateral direction. The axle beam 13 projects integrally from the axle box 9 toward the receiving seats 211. The coupling portion 214 includes, for example, a rubber bushing (not shown) that elastically couples the tip end portion of the axle beam 13 to the receiving seats 211. To be specific, the bogie 201 of the present embodiment is an axle beam type bogie.

A lower spring seat 271 is placed on the first vibrationproof rubber unit 16 from above. A concave portion 271a is formed at a middle portion of a lower surface of the lower spring seat 271. The lower spring seat 271 is positioned relative to the axle box cover 15 in the horizontal direction in such a manner that the concave portion 271a fits the tubular portion 15a of the axle box 15. With this, the upper plate 28 of the first vibrationproof rubber unit 16 is also positioned indirectly relative to the axle box cover 15 in the horizontal direction. The lower spring seat 271 includes a post member 271b projecting upward from a middle portion of the lower spring seat 271. The lower spring seat 271 includes an upper bracket portion 271c that projects outward in the horizontal direction (for example, outward in the car longitudinal direction) beyond the first vibrationproof rubber unit 16 and includes a horizontal lower surface.

A lower end of an axle spring 272 constituted by a coil spring as a suspension spring is placed on the lower spring seat 271. The side sill 273 includes a housing portion 273a that is located above the axle box 9 and open downward. An upper spring seat 274 is positioned at an upper surface of an internal space of the housing portion 273a and is placed on an upper end of the axle spring 272. To be specific, the axle spring 272 constituted by the coil spring is interposed as the suspension spring between the axle box 9 and the side sill 273. The upper spring seat 274 includes a tubular portion 274a projecting downward. The tubular portion 274a is provided so as to be spaced apart from the axle spring 272 inward in the horizontal direction and be spaced apart from the post member 271b outward in the horizontal direction. A vibrationproof rubber 275 is inserted between the tubular portion 274a and the post member 271b.

A lower surface of the upper bracket portion 271c of the lower spring seat 271 faces the upper surface of the lower bracket portion 15b of the axle box cover 15 in the vertical direction. The vertical load fluctuation sensor 21 is adhered to the lower surface of the upper bracket portion 271c. The press-contact member 36 (for example, an elastic member made of rubber or the like) made of an insulating material is adhered to the upper surface of the lower bracket portion 15b, and the press-contact member 36 press-contacts the lower surface of the vertical load fluctuation sensor 21.

The same bracket 37 as in Embodiment 1 is fixed to the lower spring seat 271. The same bracket 38 as in Embodiment 1 is fixed to the side sill 273. As with Embodiment 1, the first lateral load fluctuation sensor 22A and the second lateral load fluctuation sensor 22B are provided between the bracket 37 and the bracket 38.

The vertical load fluctuation sensor 21 is provided in parallel with the vibrationproof rubber 29 on the load transfer route from the bogie frame 204 toward the axle box 9 and follows the elastic deformation of the vibrationproof rubber 29 in the vertical direction, the vibrationproof rubber 29 supporting the downward load from the bogie frame 4. Further, the first and second lateral load fluctuation sensors 22A and 22B are provided in parallel with the axle spring 272 on the load transfer route from the bogie frame 4 toward the axle box 9 and follow the elastic deformation of the axle spring 272 in the lateral direction, the axle spring 272 supporting the downward load from the bogie frame 4. According to this configuration, as with Embodiment 1, the load measuring device is easily applicable to various bogies and capable of improving the measurement accuracy of the wheel load and the lateral pressure.

Embodiment 4

Figure 9:
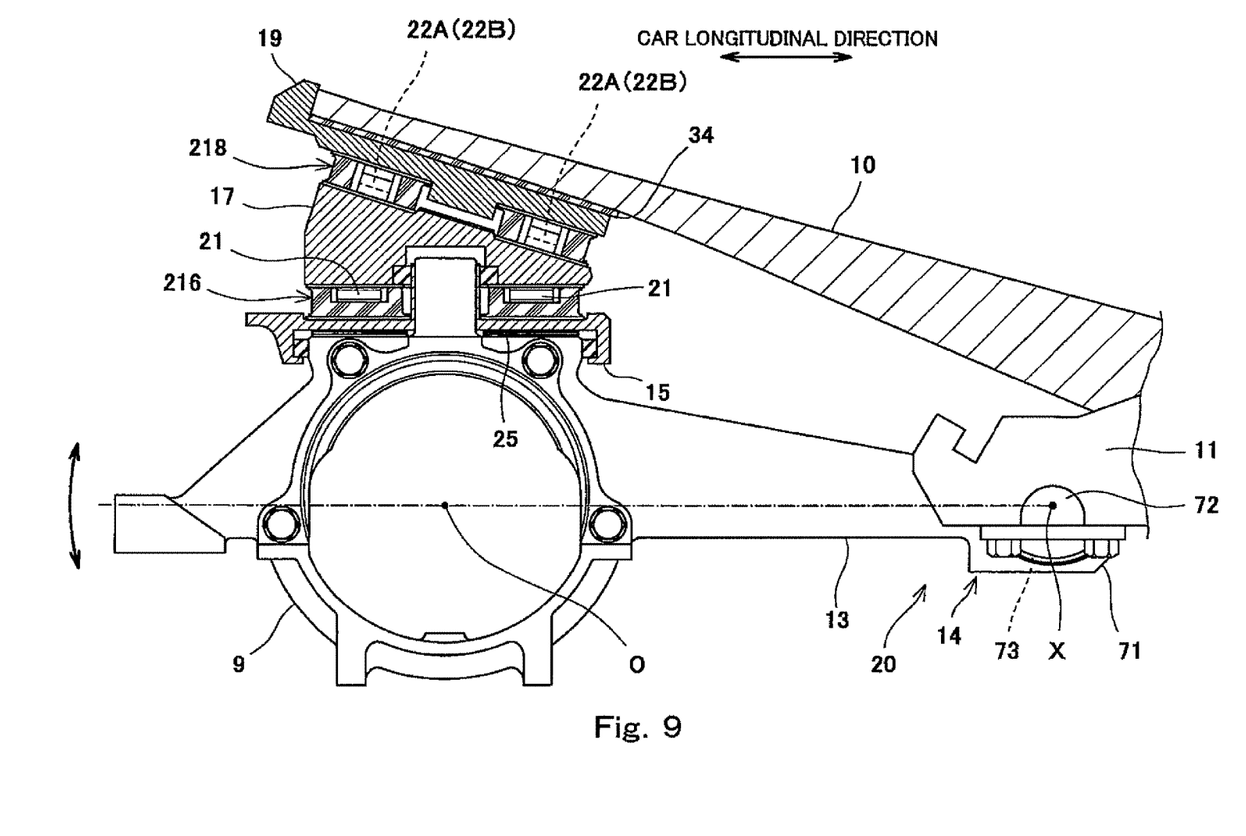
FIG. 9 is a major component side view showing a cross section of a part of the bogie according to Embodiment 4.
Figure 10:
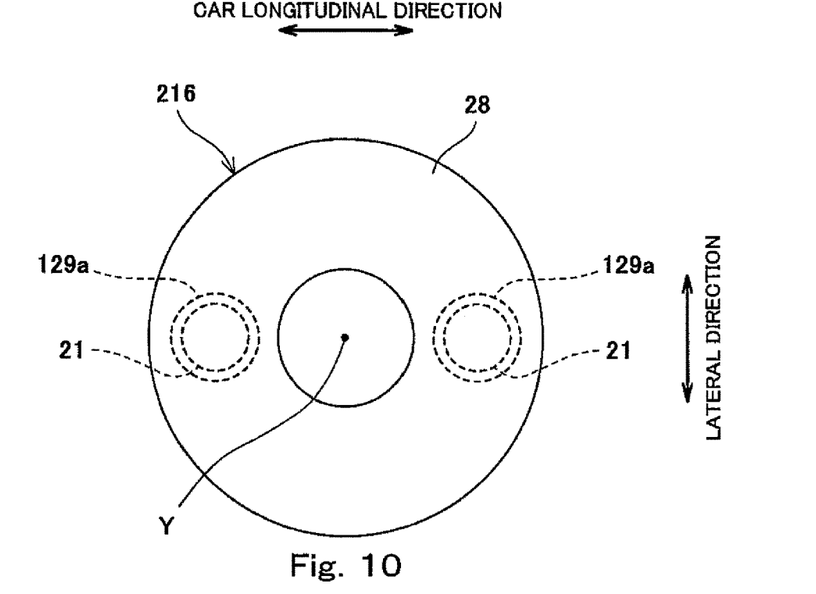
FIG. 10 is a plan view for explaining the positions of the vertical load fluctuation sensors shown in FIG. 9.
Figure 11:
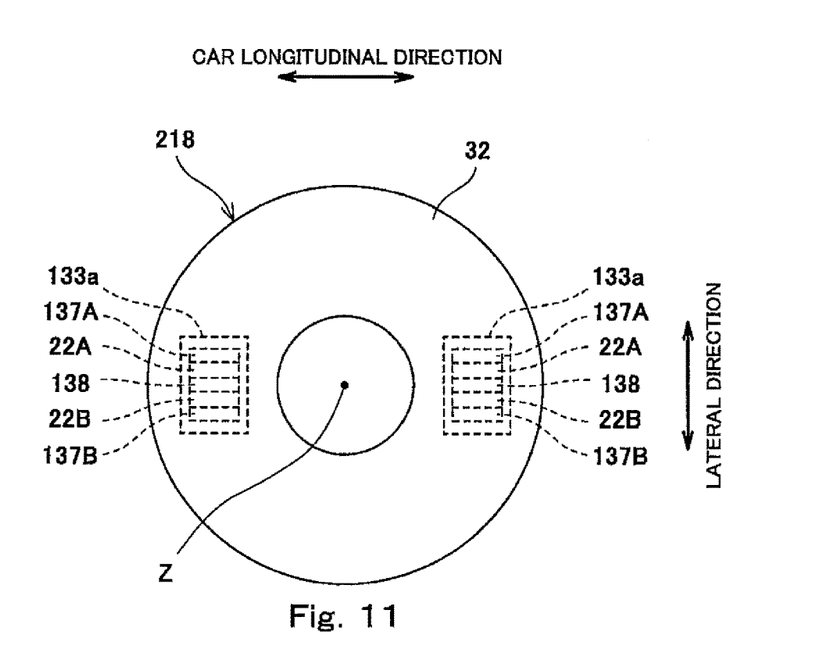
FIG. 11 is a plan view for explaining the positions of the lateral load fluctuation sensors shown in FIG. 9.

FIG. 9 is a major component side view showing a cross section of a part of the bogie according to Embodiment 4. FIG. 10 is a plan view for explaining the positions of the vertical load fluctuation sensors shown in FIG. 9. FIG. 11 is a plan view for explaining the positions of the lateral load fluctuation sensors shown in FIG. 9. The same reference signs are used for the same components as in the above-described embodiments, and explanations thereof are omitted. As shown in FIG. 9, the axle box 9 is elastically coupled to a car width direction end portion of the cross beam by the coupling device 20. The coupling device 20 includes the axle beam 13, the pair of receiving seats 11, and the coupling portion 14. The axle beam 13 projects integrally from the axle box 9 toward the cross beam in the car longitudinal direction. The pair of receiving seats 11 project from the cross beam toward the axle beam 13 and are lined up with an interval in the lateral direction. The coupling portion 14 elastically couples the tip end portion of the axle beam 13 to the receiving seats 11.

The coupling portion 14 includes: a tubular portion 71 provided at a tip end of the axle beam 13; a rod 72 fixed to the receiving seats 11; and a tubular rubber bushing 73 sandwiched between the tubular portion 71 and the rod 72. To be specific, since the rubber bushing 73 bends, the axle box 9 can swing in the vertical direction and the lateral direction using an axial center X of the rod 72 as a fulcrum. The axle box cover 15, a first vibrationproof rubber unit 216, the wedge-shaped member 17, a second vibrationproof rubber unit 218, the spring seat 19, and the like are stacked at an upper portion of the axle box 9 in this order from a lower side.

As shown in FIGS. 9 to 11, the first vibrationproof rubber unit 216 is substantially the same in configuration as the first vibrationproof rubber unit 116 of Embodiment 2, but the number of vertical load fluctuation sensors 21 accommodated in the unit 216 is different. The second vibrationproof rubber unit 218 is substantially the same in configuration as the second vibrationproof rubber unit 118 of Embodiment 2, but the number of lateral load fluctuation sensors 22A and 22B accommodated in the unit 218 is different.

In a plan view, internal spaces 129a are formed in the first vibrationproof rubber unit 216 so as to be point-symmetrical with respect to a center Y of the first vibrationproof rubber unit 216. The vertical load fluctuation sensors 21 are accommodated in the respective internal spaces 129a. Therefore, two vertical load fluctuation sensors 21 are provided so as to be point-symmetrical with respect to the center Y of the first vibrationproof rubber unit 216. In a plan view, internal spaces 133a are formed in the second vibrationproof rubber unit 218 so as to be point-symmetrical with respect to a center Z of the second vibrationproof rubber unit 218. A set of the lateral load fluctuation sensors 22A and 22B is accommodated in each of the internal spaces 113a. Therefore, two sets of the lateral load fluctuation sensors 22A and 22B are provided so as to be point-symmetrical with respect to the center Z of the second vibrationproof rubber unit 218.

The axle box 9 moves in a circular-arc manner in the vertical direction and the lateral direction using the axial center X of the rod 72 as a fulcrum. Therefore, the deformation amount of the vibrationproof rubber of the first vibrationproof rubber unit 216 differs depending on positions in the unit 216, and the deformation amount of the vibrationproof rubber of the second vibrationproof rubber unit 218 differs depending on positions in the unit 218. To be specific, the deformation amount (displacement amount) of a portion, far from the axial center X of the rod 72, of each of the first vibrationproof rubber unit 216 and the second vibrationproof rubber unit 218 is larger than the deformation amount of a portion, close to the axial center X of the rod 72, of each of the first vibrationproof rubber unit 216 and the second vibrationproof rubber unit 218. However, the calculation unit 70 (see FIG. 2) can obtain the load fluctuation at the center Y in the vertical direction by calculating an average of values output from the two vertical load fluctuation sensors 21 and can also obtain the load fluctuation at the center Z in the lateral direction by calculating an average of values output from two sets of the lateral load fluctuation sensors 22A and 22B.

Therefore, even in the axle beam type bogie in which the axle box 9 moves in a circular-arc manner, the load fluctuation at the center Y and the load fluctuation at the center Z can be obtained regardless of arrangement angles of the first and second vibrationproof rubber units 216 and 218 in a plan view. In the present embodiment, two sensors 21 or two sets of the sensors 22A and 22B are provided in one vibrationproof rubber unit. However, three or more sensors 21 or three or more sets of the sensors 22A and 22B may be provided in one vibrationproof rubber unit.

The present invention is not limited to the above embodiments, and modifications, additions, and eliminations may be made within the scope of the present invention. The above embodiments may be combined arbitrarily. For example, a part of components or methods in one embodiment may be applied to another embodiment. In the above embodiments, the vertical load fluctuation sensor 22 for calculating the wheel load P and the set of the lateral load fluctuation sensors 22A and 22B for calculating the lateral pressure Q are mounted on the bogie. However, only one of the vertical load fluctuation sensor 22 and the set of the lateral load fluctuation sensors 22A and 22B may be mounted on the bogie. In the above embodiments, the vertical load fluctuation sensor 22 is provided in parallel with the vibrationproof rubber 29, and the lateral load fluctuation sensors 22A and 22B are provided in parallel with the vibrationproof rubber 33. However, all the vertical load fluctuation sensor 22 and the lateral load fluctuation sensors 22A and 22B may be provided in parallel with the vibrationproof rubber 29 (or the vibrationproof rubber 33) (a second elastic body may be a first elastic body).

REFERENCE SIGNS LIST

1, 201 railcar bogie
4, 204 bogie frame
9 axle box
21 vertical load fluctuation sensor (first or second load fluctuation sensor)
22A first lateral load fluctuation sensor (second or first load fluctuation sensor)
22B second lateral load fluctuation sensor (second or first load fluctuation sensor)
27, 31 lower plate (lower member)
28, 32 upper plate (upper member)
29, 33, 129, 133 vibrationproof rubber (first or second elastic body)
41 lower surface electrode (first electrode)
42 upper surface electrode (second electrode)
51, 61 outer side surface electrode (third electrode)
52, 62 inner side surface electrode (fourth electrode)
43, 53, 63 intermediate member
70 calculation unit
100 load measuring device
272 axle spring (first or second elastic body)

The invention claimed is:

1. A load measuring device for a railcar bogie in which a first elastic body constituted by a vibrationproof rubber or a suspension spring is interposed between an axle box and a bogie frame, the load measuring device comprising:
   a first load fluctuation sensor disposed in parallel with the first elastic body, the first load fluctuation sensor being configured to deform in conjunction with elastic deformation of the first elastic body in a first direction that is one of either (i) a vertical direction with respect to the railcar bogie, or (ii) a lateral direction with respect to the railcar bogie, the first elastic body supporting a downward load from the bogie frame, the first load fluctuation sensor being configured to vary an electric output based on changes in electrostatic capacitance of the first load fluctuation sensor resulting from the deformation of the first load fluctuation sensor in conjunction with the elastic deformation of the first elastic body in the first direction, the deformation of the first load fluctuation sensor is parallel and directly proportional to the deformation of the first elastic body.

2. The load measuring device according to claim 1, wherein the first load fluctuation sensor includes:
   a first electrode configured to move in the first direction in conjunction with a movement of a lower end of the first elastic body in the first direction;
   a second electrode configured to move in the first direction in conjunction with a movement of an upper end of the first elastic body in the first direction; and
   a first intermediate member sandwiched between the first electrode and the second electrode in the first direction, the first intermediate member being configured to deform by relative movements of the first electrode and the second electrode in the first direction, the deformation of the first intermediate member varying electric outputs of the first electrode and the second electrode.

3. The load measuring device according to claim 2, wherein:
   the first elastic body is the vibrationproof rubber;
   the first electrode is configured to move in the first direction integrally with a lower member attached to a lower surface of the vibrationproof rubber; and
   the second electrode is configured to move in the first direction integrally with an upper member attached to an upper surface of the vibrationproof rubber.

4. The load measuring device according to claim 1, wherein the first load fluctuation sensor has a lower deformation resistance than the first elastic body.

5. The load measuring device according to claim 1, wherein the first load fluctuation sensor is located outside of the first elastic body.

6. The load measuring device according to claim 1, wherein:
   the first elastic body is the vibrationproof rubber; and
   the first load fluctuation sensor is surrounded by the first elastic body.

7. A load measuring device for a rail car bogie in which a first elastic body constituted by a vibrationproof rubber or a suspension spring is interposed between an axle box and a bogie frame, and a second elastic body constituted by a vibrationproof rubber or a suspension spring is interposed between the axle box and the bogie frame, the load measuring device comprising:

a first load fluctuation sensor disposed in parallel with the first elastic body, the first load fluctuation sensor being configured to deform in conjunction with elastic deformation of the first elastic body in a first direction that is one of either (i) a vertical direction with respect to the railcar bogie or (ii) a lateral direction with respect to the railcar bogie, the first elastic body supporting a downward load from the bogie frame, the first load fluctuation sensor being configured to vary an electric output based on the deformation of the first load fluctuation sensor in conjunction with the elastic deformation of the first elastic body in the first direction; and a second load fluctuation sensor disposed in parallel with the second elastic body the second elastic body being configured to deform in conjunction with elastic deformation of the second elastic body in a second direction that is the other of (i) the vertical direction with respect to the railcar bogie, or (ii) the lateral direction with respect to the railcar bogie, the second elastic body supporting the downward load from the bogie frame, the second load fluctuation sensor being configured to vary an electric output based on the deformation of the second load fluctuation sensor in conjunction with the elastic deformation of the second elastic body in the second direction.

8. The load measuring device according to claim 7, wherein the second load fluctuation sensor includes:

a third electrode configured to move in the second direction in conjunction with a movement of a lower end of the second elastic body in the second direction;

a fourth electrode configured to move in the second direction in conjunction with a movement of an upper end of the second elastic body in the second direction; and a second intermediate member sandwiched between the third electrode and the fourth electrode in the second direction, the second intermediate member being configured to deform by relative movements of the third electrode and the fourth electrode in the second direction, the deformation of the second intermediate member varying electric outputs from the first electrode and the second electrode.

9. The load measuring device according to claim 7, further comprising a processor configured to receive the electric output from the first load fluctuation sensor and the electric output from the second load fluctuation sensor, wherein:

based on a static wheel load input and an output relating to a vertical-direction load fluctuation from the first load fluctuation sensor or the second load fluctuation sensor while a railcar is traveling, the processor is configured to calculate a generated wheel load while the railcar is traveling; and based on an output relating to a lateral-direction load fluctuation from the second load fluctuation sensor or the first load fluctuation sensor while the railcar is traveling, the processor is configured to calculate a generated lateral pressure of a wheel while the railcar is traveling.

* * * * *